United States Patent [19]

Bolan

[11] E Patent Number: Re. 32,480

[45] Reissued Date of Patent: Aug. 18, 1987

[54] ELECTRONIC BINGO PLAYER

[76] Inventor: Patrick J. Bolan, 2117 Castelar, Omaha, Nebr. 68108

[21] Appl. No.: 861,244

[22] Filed: May 8, 1986

Related U.S. Patent Documents

Reissue of:

[64] Patent No.: 4,475,157
Issued: Oct. 2, 1984
Appl. No.: 323,265
Filed: Nov. 20, 1981

[51] Int. Cl.[4] ..... A63F 3/06
[52] U.S. Cl. ..... 364/410; 273/237
[58] Field of Search ..... 364/410, 411; 273/237, 273/269

[56] References Cited

U.S. PATENT DOCUMENTS

| | | | |
|---|---|---|---|
| 2,760,619 | 8/1956 | Peak | 273/238 |
| 3,120,657 | 2/1964 | Hooker | 273/237 |
| 3,671,041 | 6/1972 | Taylor et al. | 273/237 |
| 4,019,744 | 4/1977 | Pizur | 273/269 |
| 4,080,596 | 3/1978 | Keck | 273/237 |
| 4,218,063 | 8/1980 | Cooper | 273/269 |
| 4,222,571 | 9/1980 | Molat | 273/237 |
| 4,365,810 | 12/1982 | Richardson | 273/237 |
| 4,378,940 | 4/1983 | Gluz et al. | 273/237 |
| 4,436,308 | 3/1984 | Rose et al. | 273/237 |
| 4,455,025 | 6/1984 | Itkis | 273/237 |

*Primary Examiner*—David H. Malzahn
*Attorney, Agent, or Firm*—Zarley, McKee, Thomte, Voorhees & Sease

[57] ABSTRACT

An electronic bingo playing apparatus and method involve the use of a hand held portable computer having a card memory which can store the content information from a plurality of standard bingo cards. This information is entered by a keyboard. Letter/number combinations which are selected during play of the game are also manually entered by the keyboard. The program memory then directs the microprocessor to search the stored cards for a match and any winning patterns of matches. Upon detection of a winning pattern, the portable computer responds with the winning card number, as well as the particular winning pattern.

7 Claims, 4 Drawing Figures

ELECTRONIC BINGO PLAYER

Matter enclosed in heavy brackets [ ] appears in the original patent but forms no part of this reissue specification; matter printed in italics indicates the additions made by reissue.

BACKGROUND OF THE INVENTION

The present invention is directed generally to a hand held portable electronic bingo playing aid and more particularly to the system for playing bingo wherein the content of a plurality of bingo cards is stored in a portable computer which is capable of then identifying and accumulating matches during play of the game and signaling when a winning pattern of accumulated matches has been achieved.

Bingo has been a popular public past time for many years and there are reportedly millions of bingo players in the United States alone. It has been the art of bingo players over the years to develop mental and manual systems to enable playing the game with a greater number of cards. This has been prompted by the fact that a player's chances of winning a given game can be increased in proportion to the number of cards he or she is able to keep track of. The inexperienced player may have to limit himself to two or three cards to keep up with a game and even experienced players have a limit to the number of cards which their mental processes and/or creative systems can keep up with. Elderly players may be limited to playing a small number of cards because of failing eyesight, muscular coordination or slowing down of the mental processes.

Electronic bingo games have previously been proposed wherein individual electronic cards are electrically connected to a master control panel whereby the individual electronic cards display by lights or otherwise the called signals from the control panel. These systems facilitate play of the game but are operative only in establishments where the operator is provided with the necessary control panel and the players have access to a great number of the electronic cards. Since most bingo halls are not so equipped, the practical use of these systems is limited.

Accordingly, there is a need for a portable hand held electronic bingo playing aid which is self-contained and which is operable by a single player to keep track of a plurality of cards in a setting where others may be using manual cards and the numbers are called out in conventional fashion.

A primary object of the invention therefore is to provide an improved electronic bingo playing aid.

Another object is to provide an electronic bingo playing aid which is self-contained and operable independent of any electrical communication with any other devices operated by the game operator or other players.

Another object is to provide an electronic bingo playing aid which enables an individual player to easily play a greater number of cards than he could otherwise keep track of with known mental and manual systems.

Another object is to provide an electronic bingo playing aid which constantly checks for winning patterns of matched letter/number combinations and which immediately alerts the player when a winning pattern has been achieved.

Finally, a further object is to provide an electronic bingo playing aid which is easy to operate and economical to manufacture.

SUMMARY OF THE INVENTION

The bingo playing system of the present invention utilizes a hand held portable computer having the capability of storing the numerical and positional information from a plurality of standard bingo cards prior to play of the game by entering this data into the device through a built-in keyboard. During play, called numbers are manually entered into the device by the same keyboard. The portable computer then automatically searches the stored cards for a match and any winning pattern of matches. Upon detection of a winning pattern, the portable computer signals that a winning pattern has been achieved, by perhaps displaying the identification number of the winning card as well as the particular winning pattern.

The bingo playing system of the present invention aids both the player and the operator of the game. The player is benefited when using the portable computer by being able to play any number of cards as easily as playing one. Furthermore, the player does not miss a winning bingo pattern which otherwise often happens when playing many cards. The bingo hall or operator benefits by being able to sell more cards and thus increasing his profits.

The portable computer of the invention is easy to operate and, in addition to making the game faster and easier for those now playing the game, has the potential for attracting those people who seem to have an addiction to such devices in this mushrooming age of computers.

DESCRIPTION OF THE PREFERRED EMBODIMENT

Figure 1:
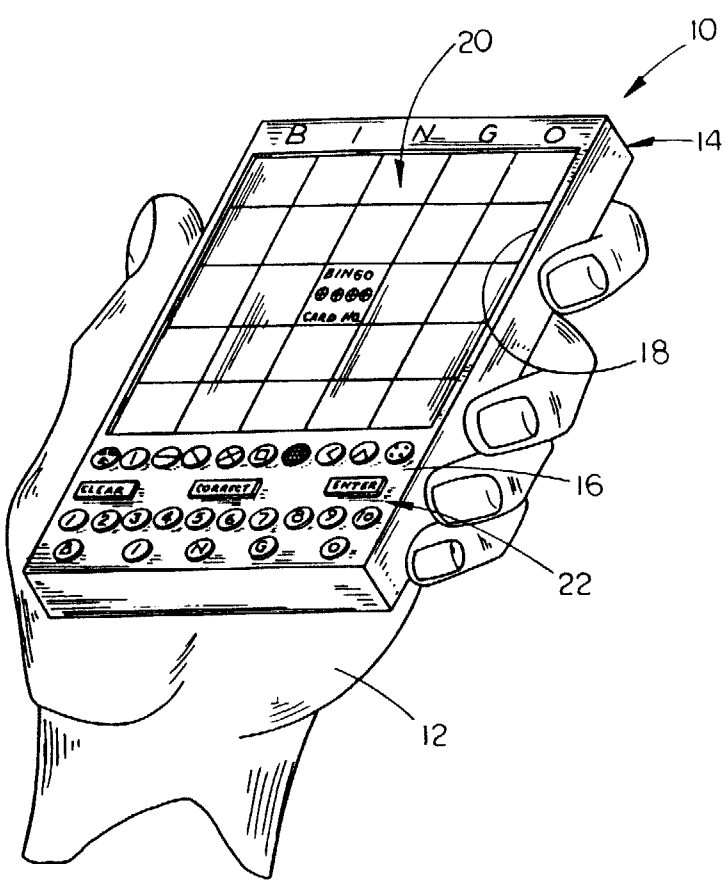
FIG. 1 is a perspective view of the portable computer of the invention in the hand of a bingo player.

The electronic bingo player of the present invention includes a hand held portable computer 10 which is shown in FIG. 1 easily held within the hand 12 of a bingo player. The portable computer includes a relatively thin flat housing 14 having a top wall 16 which is provided with an opening 18 for exposing a display 20.

Figure 2:
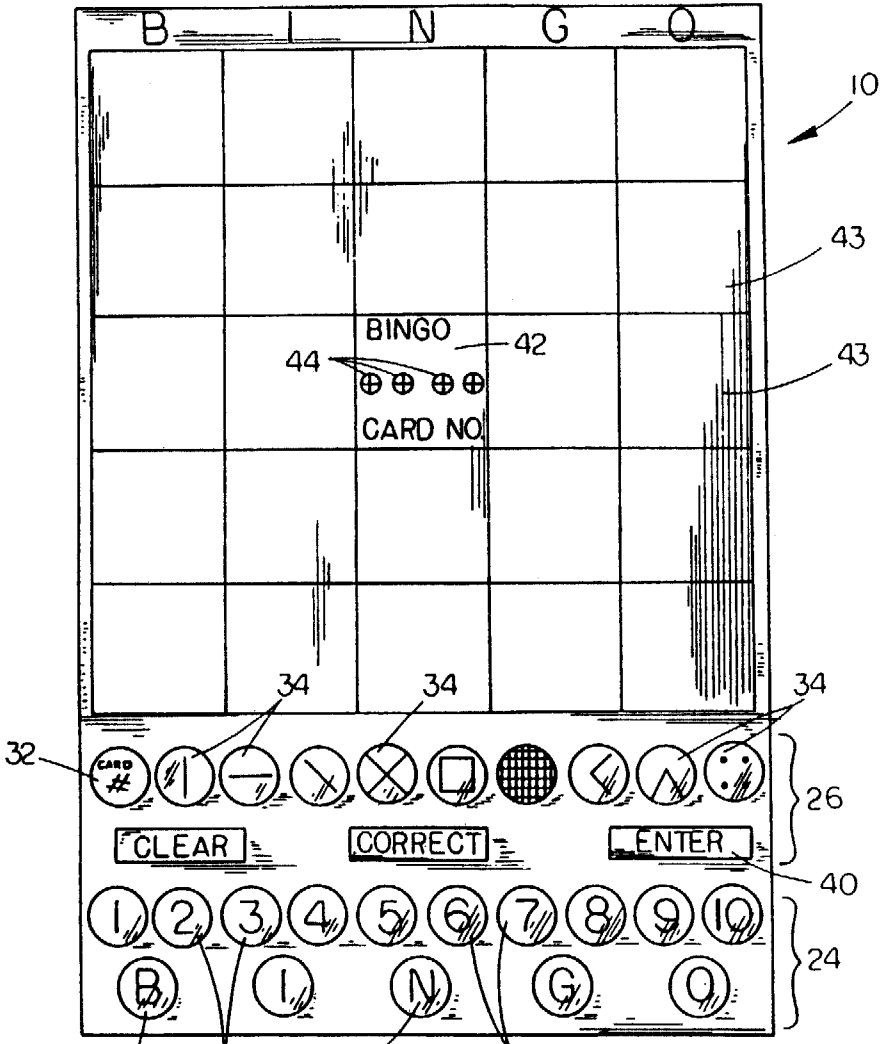
FIG. 2 is an enlarged plan view of the face of the portable computer.

A keyboard, indicated generally at 22, is situated on top wall 16 adjacent display 20 and includes a plurality of data entry keys 24 and a plurality of instruction keys 26, as more clearly illustrated in FIG. 2. The data entry keys 24 include ten numerical digit entry keys 28 and five alphabetic character entry keys 30 bearing the letters of the word "Bingo" and corresponding to the columns of display 20. The instruction keys 26 include a card number key 32, a plurality of winning pattern designation keys 34 and three functional keys including a clear key 36, correct key 38 and an enter key 40.

The display 20 includes a center display unit 42 surrounded by a five-by-five matrix of 24 seven-segment display units arranged to correspond to the positions of a standard bingo card. The center display unit 42 is capable of displaying the identification number of a given card and may additionally be provided with four signal lights 44 for indicating the player's progress toward acquiring a winning pattern, as explained hereinbelow.

Figure 3:
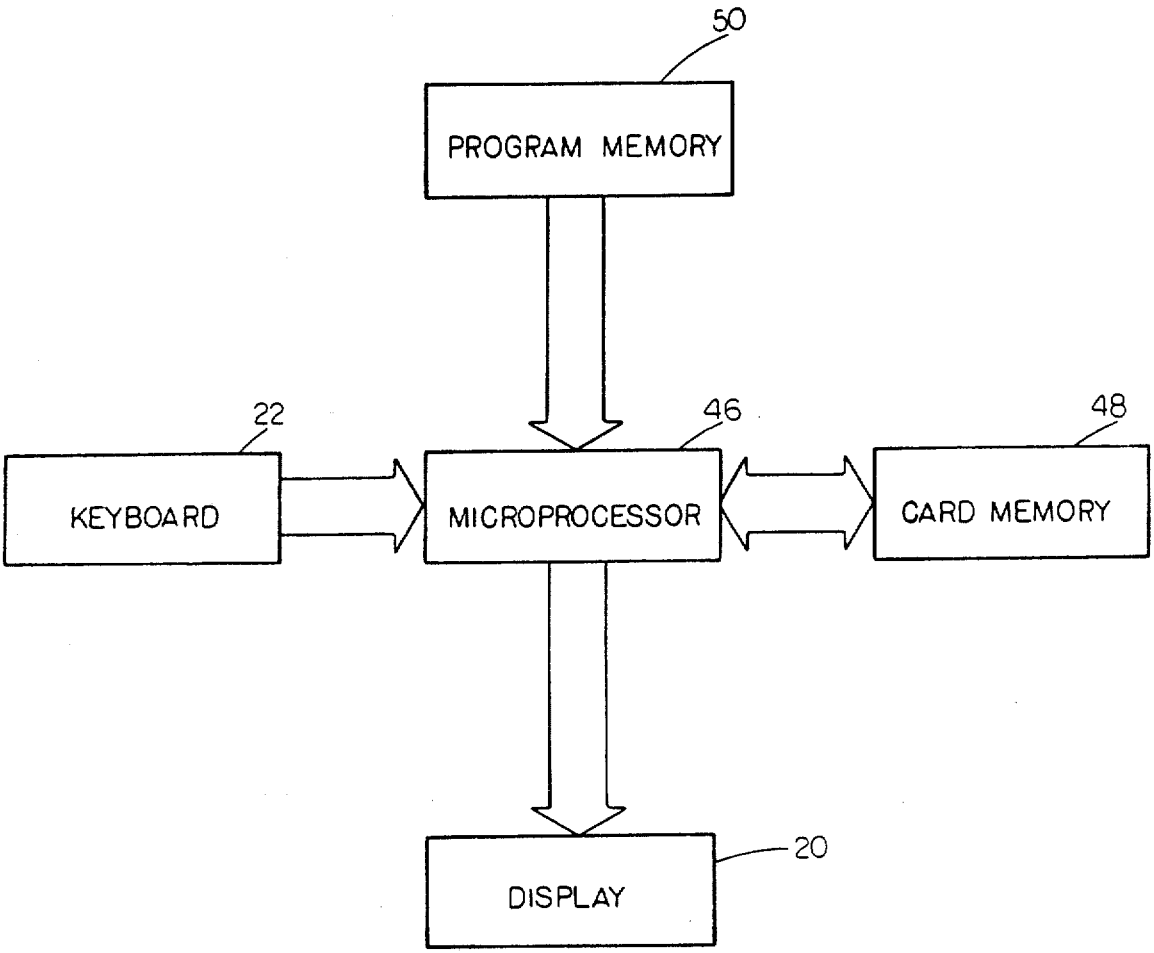
FIG. 3 is a block diagram illustrating the operation of the portable computer.

The portable computer 10 will first be described with reference to the block diagram of FIG. 3. The heart of the device is the microprocessor 46 which controls data flow to and from all other parts of the device, does calculations and data manipulations. A card memory 48 serves to temporarily store the content data for a plurality of bingo cards during the play of a game, which information is input through the keyboard 22. Display 20 serves to show all information entered from the keyboard 22 for verification purposes and displays winning card and winning pattern information. Finally, the program memory 50 holds the software program which directs the action of microprocessor 46.

Figure 4:
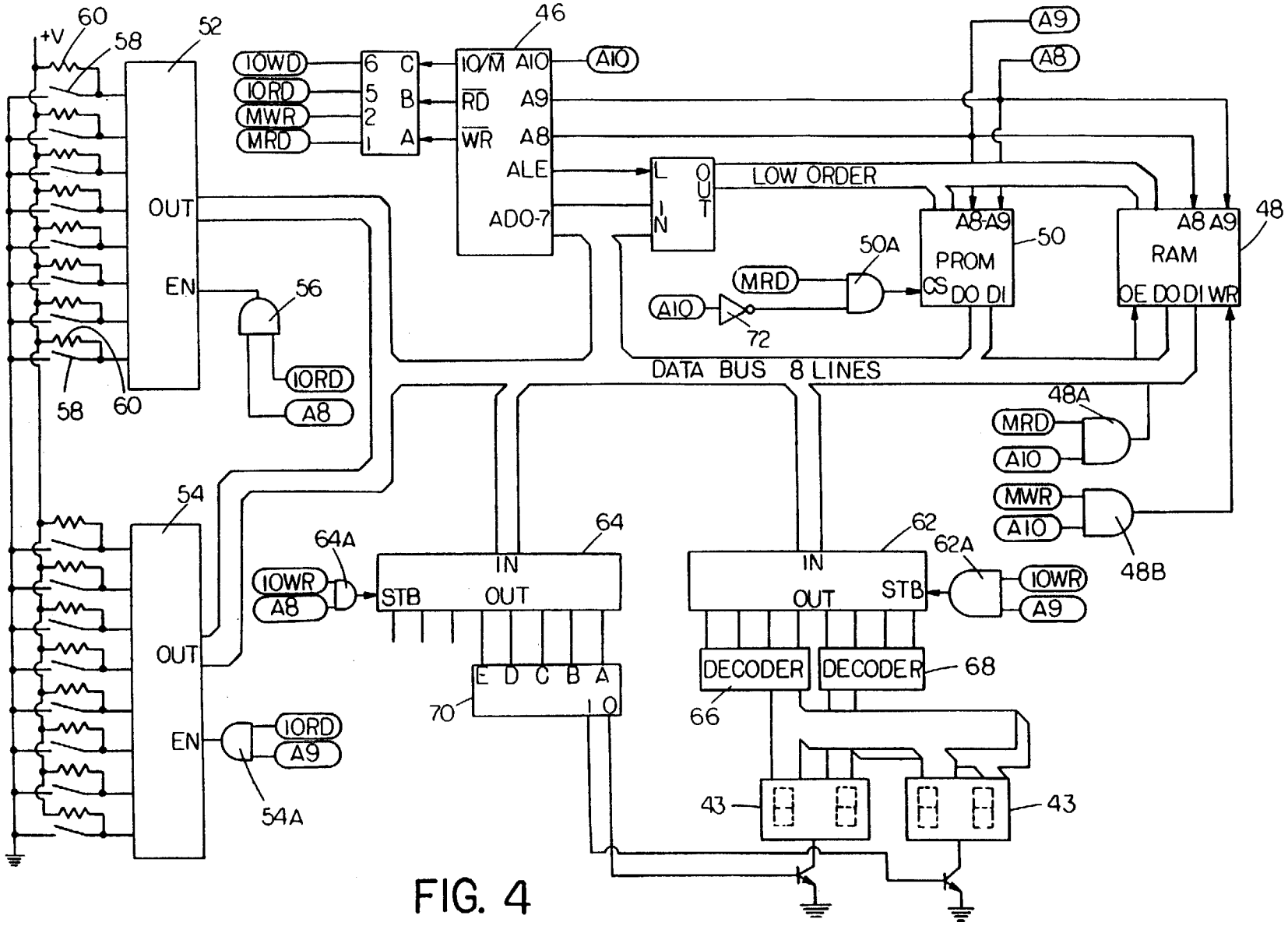
FIG. 4 is an electrical schematic diagram of a preferred embodiment of the portable computer of the invention.

Referring to the electrical schematic diagram of FIG. 4, the microprocessor 46 begins operating in a set-up mode under the direction of the program memory 50 when the power is turned on by a conventional on-off switch, not shown. The microprocessor 46 first senses the condition of all keyboard switches by accepting data from each of two 8-bit input ports 52 and 54. The first instructions from the microprocessor 46 would thus be for IORD and A8, whereupon the And gate 56 produces an output which causes the switches of input port 52 to be read. The individual switches 58 of input port 52 are provided with pull up resistors 60 and normally have a high output of 1. When the corresponding key of keyboard 22 is pushed, a switch 58 is closed with the result that the output voltage goes low to zero. As the microprocessor 46 scans the output, any low signal is detected and that information is directed to the display for verification of the entered data.

The microprocessor 46 controls the display 20 by directing data from the input port 52 or card memory 48 to a data output port 62. The microprocessor also loads a number into the display destination port 64. This number determines which display unit 43 will show the information. For example, if numerical digit keys 28 are pushed to enter the number 13, the digits 1 and 3 are latched into the output port 62 and converted to 7-segment form by the decoders 66 and 68 for communication to the appropriate 7-segment display 43.

Selection of the proper display is accomplished by the latched output port 64 which receives a signal from program memory 50 as to the proper display according to whichever keys 24 were pressed. The operator can then visually check the number that was pressed and then press either the correct or enter button to either change or enter that information. The entered information is stored in the card memory 48.

Once the content data for all of the bingo cards which are to be played is entered into the card memory 48, the microprocessor 46, under the direction of program memory 50 is switched to the play mode. The microprocessor first issues instructions of IORD and A8 and IORD and A9 to sequentially scan all of the keyboard switches 58. Until any input keys are pressed, the microprocessor can be said to be idling in a program loop. When the output of one of the switches 58 goes low, that information is read, and displayed as described above for verification and then entered into the card memory 48 upon pressing the enter key 40. A search is then made of card memory 48 to determine if the inputted number matches a number on any of the stored cards. If a match is found, it is recorded in the card memory 48 and a search is made of all accumulated matches to determine if a winning pattern has occurred. If no winning pattern has occurred, the microprocessor again monitors the keyboard 22 in wait for the next key press.

The patterns which are to be recognized as winning patterns for any given game are selected at the end of the set-up mode by pressing the appropriate pattern keys 34. These include the conventional vertical, horizontal and diagonal patterns as well as the "X", square, full card, Vee, inverted Vee and four corners.

When one or more winning match patterns are detected, the microprocessor outputs the identification number of the appropriate card from the card memory 48 to the center display unit 42 of display 20 through the appropriate output ports 62 and 64 and decoders 66, 68 and 70. The display to actually show the data is selected by the decoder 70. Likewise, the numbers of the winning pattern itself are also displayed in the appropriate display units 43. Note that the output information is constantly sequentially displayed on the 7-segment displays 43 but the cycling is accomplished so fast that it appears that the various output displays are being activated simultaneously. This is referred to as multiplexing.

Operation of the portable computer 10 of the present invention is thus quite simple. A player purchases as many bingo cards as he or she wants to play and then enters the letters and numbers appearing on those cards into the computer by first pressing the card number key 32 and then the identification number appearing on the center square of the card. The player then presses the letter "B" and enters all numbers in this column and continues this process for the columns "I", "N", "G", and "O". The player continues in this manner for each of the cards to be played after first pressing the card number key 30 and entering the content data either in the chronological order of the cards or by an identification or serial number on the cards.

After entering all of the cards to be played, the player must then press the appropriate pattern keys 34 which will be recognized in the particular game as a winning pattern.

Then when a number is called by the caller such as "N-40", the player presses the button for the letter "N" and the buttons for the numerals 4 and 0. The machine searches the card memory for this letter/number combination and records it when found. The process continues until a BINGO is reached at which time the center square, the free square, will light and show the number of the card on which the BINGO appears. That card number will be displayed in the center display unit 42 and the letter/numerical combinations of the winning pattern will be displayed in the appropriate display units 43. At this time the house employee will call back the numbers to confirm BINGO and also check the card of the player to be certain that he or she actually has a card containing the same numbers and placement. Thus it will be required that the player keep the cards entered into the machine in front of him while those cards are being played.

The four signal lights 44 add excitement to the game by alerting the player when he gets close to a BINGO. For example, all four red lights 44 would be on at the beginning of the game since theoretically only four numbers are needed with the center square being free.

These red lights would go out one by one as the player gets closer, with one light indicating that only one number is needed for BINGO.

It is important that the machine be provided with the capability of clearing individual game number entries without erasing the content data of the stored cards to enable an operation equivalent to clearing the markers or plastic chips without losing the card content information from the memory. This is accomplished by pressing the clear key 36 which causes the microprocessor 46 to dump all letter/number combinations and accumulated matches of the previous game but to retain the content data for the cards being played. But for this feature, a player would have to reload the content data between games, a procedure which would likely require more time than is usually available.

Certain additional features of the invention are shown in electrical schematic diagram of FIG. 4. The input port 54, card memory 48, program memory 50, output port 62, and display port 64 are all accessed by respective And gates 54A, 48A, 48B, 50A, 62A and 64A, each of which produces an output only when both inputs are energized. Note the inverter 72 on the A10 input And gate 50A. If A10 is active, it inputs to the And gates 48A and 48B and if it is inactive, it inputs to the And gate 50A.

Microprocessor 46 may be of the type designated by numeral 8085. Other microprocessors could also be suitable although the schematic circuit would have to be modified to accommodate alternate units. The card memory 48 may be a 1 K memory which is easily capable of storing all of the information for at least 16 standard bingo cards.

Whereas a preferred embodiment has been shown and described herein, it will be understood that many modifications, alterations and variations may be made within the intended broad scope of the appended claims. For example, the portable computer may be provided with means for cancelling any given card so that another could be entered in its place. Another feature may be to have a method of transferring the content data of the entered cards to a temporary memory thus allowing certain special games to be entered and played and then recalling the primary cards when the special is over.

Thus there has been shown and described a portable hand held electronic bingo player which accomplishes at least all of the stated objects.

I claim:

1. An electronic bingo playing apparatus for keeping track of a plurality of five row/five column conventional bingo cards, said apparatus comprising a hand held portable computer which includes, a keyboard comprising a plurality of data entry keys and instruction keys, said data entry keys including ten numerical digit entry keys [and five alphabetic character entry keys corresponding to respective columns of a bingo card], said instruction keys including a plurality of winning pattern designation keys, a card memory operative to temporarily store bingo card content data and played number data entered by said data entry keys, a display operative to display numerical information, said display comprising a five-by-five matrix including a center display unit and 24 separate numerical display units arranged about said center display unit, a microprocessor operative to control data flow from said keys to said card memory and display and between said card memory and display, and to perform data manipulations, and a program memory in which there is stored a software program to direct microprocessor operation, said microprocessor being operative in a set-up mode under the direction of said software program to store in said card memory the bingo card content data which is entered by said data entry keys, and to record winning pattern information which is entered by said instruction keys, and said microprocessor being operative in play mode under the direction of said software program to scan the keyboard thereby to read each letter/number combination which is entered by said data entry keys, to scan the card memory to identify any matches between the last entered letter/number combination and the stored card content data therein, to accumulate said matches and to signal whether any winning patterns of accumulated matches have been achieved, said data entry keys and instruction keys thereby being capable of entering all of the input information in both the setup and play modes of the microprocessor.

2. The apparatus of claim 1 wherein said card memory comprises a random access memory.

3. The apparatus of claim 1 wherein said program memory comprises a programmable read only memory.

4. The apparatus of claim 1 wherein said microprocessor is of the type designated by numeral 8085.

5. A method of playing bingo, comprising, providing a hand held portable computer having the capability of storing content data for a plurality of bingo cards, scanning the stored content data to identify matches with letter/number combinations with are entered during play of the game, accumulating said matches, and identifying and signaling whether any winning patterns of accumulated matches have been achieved, entering into said portable computer bingo card content data for a plurality of bingo cards by pressing selected *numerical digit* entry keys [and five alphabetic character entry keys corresponding to respective columns of a bingo card], instructing said portable computer as to which patterns will be regarded as winning combinations of accumulated matches by depressing a selected number of winning pattern designation keys of said keyboard, then sequentially entering into said portable computer by said numerical digit entry keys [and alphabetic character entry keys] each [latter/number] *letter/number* combination which is selected during play of the game, and actuating said portable computer to scan the stored content data to identify any matches with the last entered letter/number combination, to accumulate said matches, and to signal whether any winning patterns of accumulated matches have been achieved.

6. The method of claim 5 wherein the step of signaling whether any winning patterns of accumulated matches have been achieved comprises displaying the identification code of a winning card letter/number combinations which achieve the winning pattern.

7. The method of claim [8] *5* further comprising clearing from the portable computer the letter/number combinations which were entered during the play of a particular game.

* * * * *